United States Patent
Lee

(10) Patent No.: US 6,220,422 B1
(45) Date of Patent: Apr. 24, 2001

(54) ROTARY ARTICULATED PUSHER FOR REMOVING ITEMS, SUCH AS LUGGAGE, FROM A CONVEYOR BELT

(75) Inventor: Phillip L. Lee, Leesburg, FL (US)

(73) Assignee: G & T Conveyor Company, Inc., Tavares, FL (US)

( * ) Notice: Subject to any disclaimer, the term of this patent is extended or adjusted under 35 U.S.C. 154(b) by 0 days.

(21) Appl. No.: 09/221,508

(22) Filed: Dec. 28, 1998

(51) Int. Cl.$^7$ ................................................. B65G 47/82
(52) U.S. Cl. .......................................................... 198/370.07
(58) Field of Search ........................................ 198/370.07

(56) References Cited

U.S. PATENT DOCUMENTS

| | | | |
|---|---|---|---|
| 3,026,988 | * 3/1962 | Fisk ........................................ | 198/24 |
| 3,083,808 | 4/1963 | Graybeal . | |
| 3,198,308 | 8/1965 | Driesch et al. . | |
| 3,593,862 | * 7/1971 | Pierson .............................. | 214/11 R |
| 3,920,541 | * 11/1975 | VandenBerg et al. ................ | 209/74 |
| 4,082,174 | * 4/1978 | Stobb .................................... | 198/368 |
| 4,295,559 | 10/1981 | Neal et al. . | |
| 4,441,604 | 4/1984 | Schlig et al. . | |
| 4,572,350 | * 2/1986 | Besemann ............................ | 198/372 |
| 4,643,291 | * 2/1987 | Counter et al. ...................... | 198/356 |
| 5,010,998 | * 4/1991 | Macmillan ............................ | 198/372 |
| 5,217,104 | * 6/1993 | Pelletier ................................ | 198/367 |
| 6,041,910 | * 3/2000 | Avery et al. ..................... | 198/370.07 |

* cited by examiner

Primary Examiner—Joseph E. Valenza
Assistant Examiner—Rashmi Sharma
(74) Attorney, Agent, or Firm—Julian C. Renfro, Esq.

(57) ABSTRACT

For use with an elongate conveyor belt designed to transport articles from one location to another, a novel pusher device mounted adjacent one long side of the belt. The pusher device utilizes an elongate, rotatably mounted arm having first and second ends, with the first end being pivotally affixed at a location relatively close to the belt, and arranged to rotate about the fixed pivot for less than 90°. The arm normally resides in an inactive position extending along the long side of the belt, with the second end of the arm being arranged to move outwardly, on occasion, from the inactive position and across at least a portion of the belt when an article is to be deflected off of the belt. An article-engaging paddle is pivotally mounted on the second end of the arm, and a novel actuating device causes selected rotation of the arm about the fixed pivot, such that upon the actuating means being activated to cause the arm to undertake rotation about the fixed pivot, the paddle will move in an outward stroke to briefly contact the selected article and to cause such article to be deflected off of the belt. The actuating device thereafter causes the arm to undertake a rapid return stroke and to resume its inactive position.

30 Claims, 11 Drawing Sheets

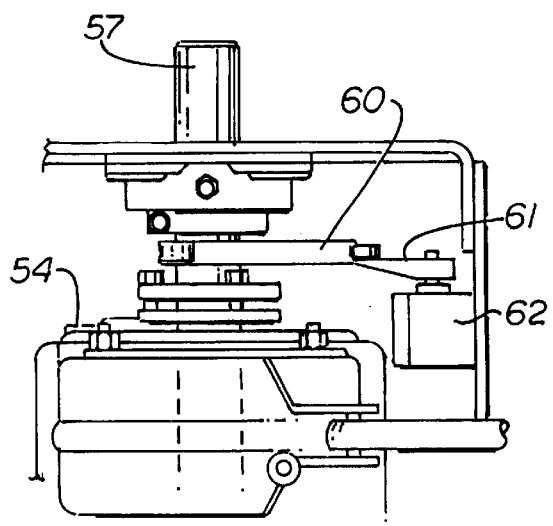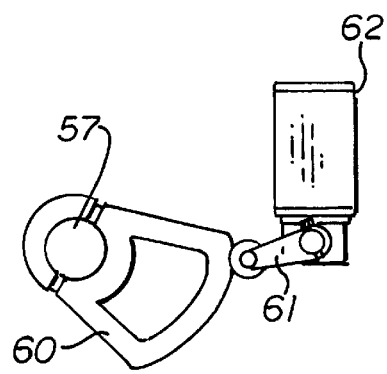
FIG 7  FIG 8
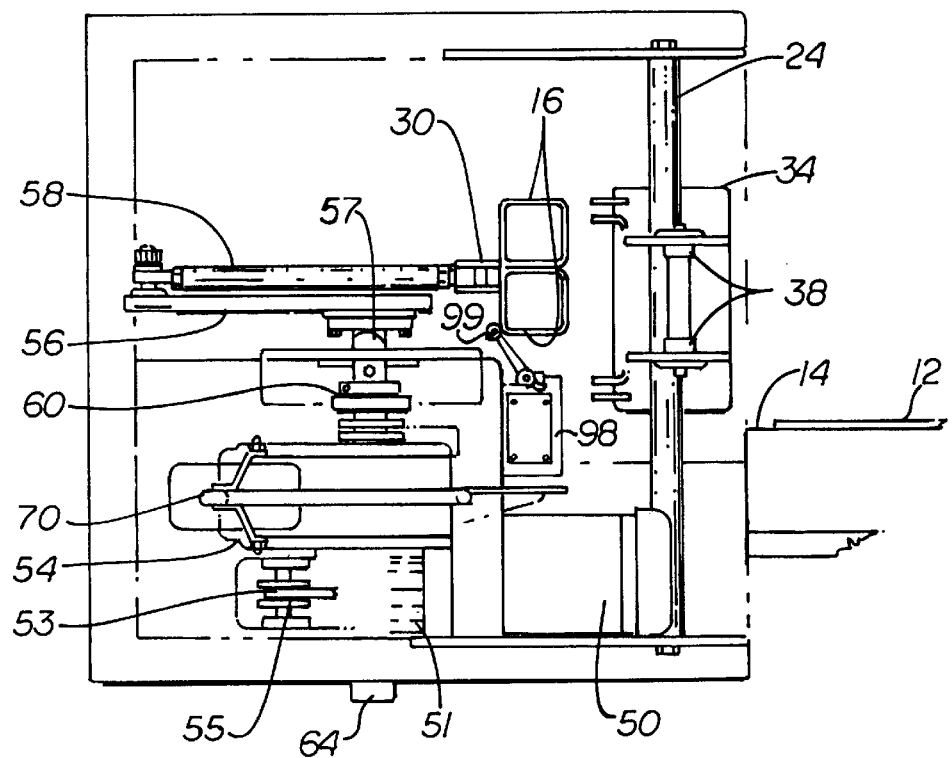
FIG 9

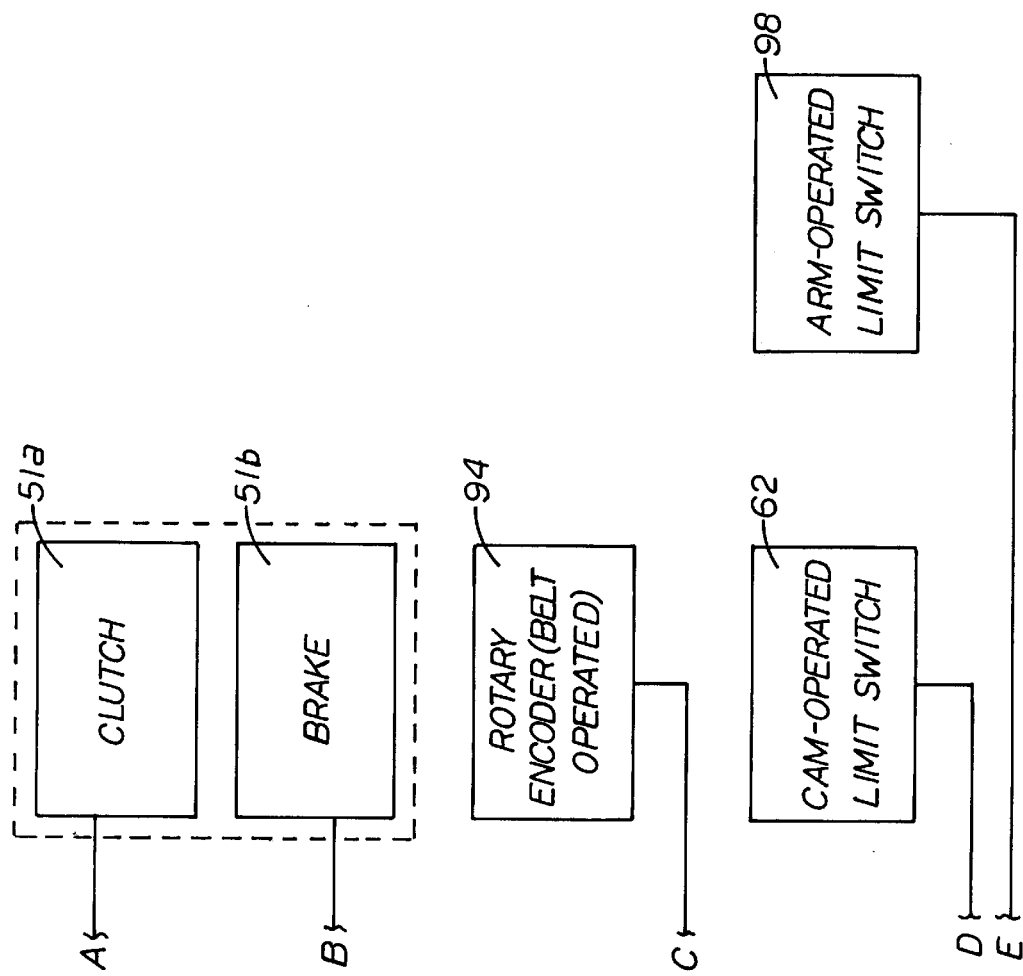

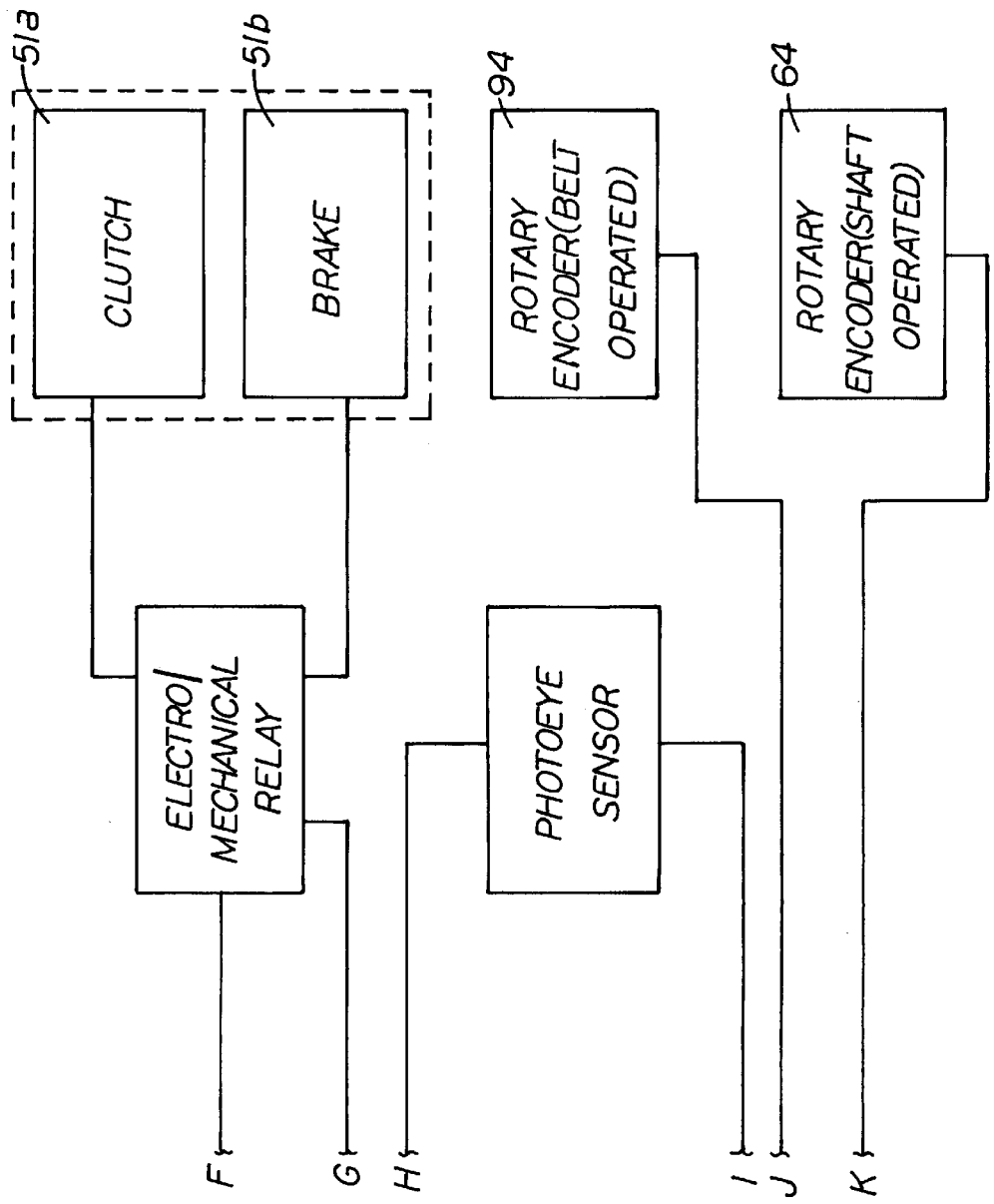

ROTARY ARTICULATED PUSHER FOR REMOVING ITEMS, SUCH AS LUGGAGE, FROM A CONVEYOR BELT

BACKGROUND OF THE INVENTION

This invention relates to improvements in material handling apparatus and, more particularly, to a mechanism for pushing and diverting objects from conveyors.

It is well known in the prior art of material handling to employ conveyors with moving belts or the like for transporting objects of various sizes and shapes along a path. It is also common practice to utilize diverters along the path for transferring, sorting or distributing the objects at certain points to other locations such as auxiliary conveyors, spurs or outflow chutes. Such arrangements have particular utility in warehouses, factories, truck terminals, shipping rooms, mail bag and courier distribution and airline baggage systems. In these applications, the diverters may individually, or in combination, push an object at some angle across a conveyor belt, block an object at some angle to the belt so that the belt motion causes the object to slide across the belt, or arrest the motion of and snatch the object from the belt. Additionally, the diverters may employ linear, translatory, or rotary movement of one or more object engaging devices which move through forward and return cycles to unload or remove objects form the belt.

For example, U.S. Pat. No. 3,198,308 to Driesch et all discloses a linear pusher having a paddle fixed at the end of a reciprocating piston rod and parallel to the conveyor belt. Driesch et all also disclose a snatcher having a paddle pivotally attached at one end of a framework and at its end portion to the end of a reciprocating piston rod.

U.S. Pat. No. 3,026,988 to Fisk and U.S. Pat. No. 4,295,559 to Neal et al are illustrative of air-actuated translatory linkages used to move together with an article along the conveyor while simultaneously shifting the article transversely of the conveyor.

U.S. Pat. No. 3,083,808 to Graybeal and U.S. Pat. No. 4,441,604 to Schlig et al disclose rotary pushers wherein dual paddles are revolved in a rotary motion to engage objects such that the face of each paddle will always remain parallel to the direction of belt travel.

Various attempts have been made by each of these patents to upgrade sorting or orienting capability of objects at high speeds by provision of different paddle linkages and their associated drives along with the ensuing geometric motion produced thereby. However, there remains a need in this well-developed art for a diverting pusher which is capable of accomplishing transfer of objects at high rates by controlling the motion and speed of the paddle on a push phase of a cycle for gentle object handling, and then performing the remainder of the cycle rapidly to maximize cycle rate and reduce the spacing between conveyed objects.

For instance, when utilizing some prior art devices, some paddles may dwell too long at the end of their forward stroke or operate with time delays which can create jams and missorts. In other cases, the moving mass of the paddle may be at maximum velocity at time of impact with the object with resultant damage or destruction to the objects. These are particularly sensitive drawbacks when diverters or pushers are used in the handling of airline baggage which may vary tremendously in size, shape and fragility.

As will be seen hereinafter, it is a principal object of the invention to provide an improved pushing and diverting mechanism for unloading a wide variety of objects from a conveyor at a high rate of speed with accuracy and control.

SUMMARY OF THE INVENTION

The design goals for my novel rotary articulated pusher utilized in conjunction with a luggage-transporting conveyor belt are as follows:

1. To provide a rotatably mounted pusher arm upon which a unique article engaging device or deflecting paddle is mounted, with the article engaging device being designed to contact and move luggage at a moderate and controlled rate of speed;
2. To accelerate the luggage or bag to a higher lateral rate of speed near the end of the push phase;
3. To return the rotatably mounted pusher arm and article engaging device to its "at rest" position (completion of 360 degree rotation) at a higher average of speed than the push phase; and
4. To provide a rotating power applying member for bringing about selective movement to the rotatably mounted pusher arm, with such rotating power applying member bringing about smooth motion of the pusher arm and article engaging device during the removal of an article from the conveyor belt as well as during the return of the pusher arm and article engaging device to an "at rest" position, thus entirely avoiding the utilization of reciprocatory movement in the powering of the rotatably mounted pusher arm.

It will hereinafter be seen in considerable detail that in accordance with this invention I have provided my highly advantageous pusher device or transfer mechanism for use with an elongate conveyor belt operably arranged on a generally horizontally disposed support surface. The conveyor belt is designed to move in a substantially conventional manner along the support surface and to transport articles from one location to another. Mounting means provided in accordance with the instant invention are operably located on the support surface relatively close to one long side edge of the conveyor belt, upon which mounting means the novel pusher device or transfer mechanism is operably mounted.

The elongate, rotatably mounted pusher arm has first and second ends, with the first end being pivotally affixed to the mounting means relatively close to the long side edge of the belt. The rotatably mounted pusher arm is arranged to rotate about the mounting means for less than 90°, with the pusher arm normally residing in an inactive position in general alignment with the long side edge of the belt.

The second end of the pusher arm is arranged to extend, on occasion, from the inactive position, across at least a portion of the conveyor belt when a selected article carried by the belt is to be deflected off the belt into a specified chute or the like. The article-engaging paddle is mounted on this second end of the rotatably mounted pusher arm, and actuating means are provided for causing, on occasion, selected rotation of the rotatably mounted arm in an arcuate manner about the mounting means. The actuating means utilizes a rotating power applying member, and upon the actuating means being activated to cause the rotatably mounted pusher arm to undertake rotation about the mounting means, the article-engaging paddle will briefly contact the selected article, and cause such article to be deflected off the belt into the designated location. The actuating means thereafter causes the rotatably mounted pusher arm to smoothly return to its inactive position.

Because of the relatively long article-engaging paddle utilized in accordance with this invention, and the highly advantageous motion undertaken by the paddle, any tendency of the contacted article to rotate out of the paddle's influence as a result of early or late contact by the pusher paddle is minimized, thus making it unlikely that the designated chute will be missed.

Accordingly, it is a principal object of my invention to provide an improved pushing and diverting mechanism for selectively unloading a wide variety of designated objects from a conveyor belt, with such diversion being rapidly accomplished with both accuracy and careful control.

It is another object of my invention to furnish a rotary type sorting device of relatively inexpensive construction, which combines linear and articulated movements such that objects will be deflected from a conveyor belt in a highly desirable manner, with the necessary elements for achieving rotary articulated motion being minimized such that cycle rate is maximized, that is, the number of articles removed from a belt per minute is substantially increased over conventionally used devices.

It is yet another object of my invention to provide a pusher mechanism or article deflection device that will successfully divert luggage varying considerably in size, across the relatively wide conveyor belts in present day use, using the long reach of a highly advantageous rotary arm in combination with an article-contacting paddle arranged to rotate approximately 45° during use, such that any tendency of the contacted luggage to miss the designated chute is minimized.

It is still another object of this invention to contact belt conveyed luggage with a pusher paddle of substantial length that is arranged to travel in an arc across the conveyor belt in a direction consistent with the direction of belt travel and to change its angular position during such travel, and by this changing angular position of the pusher paddle, effectively controlling the luggage orientation, such that discharge of the luggage into a designated chute or onto a spur conveyor will be accomplished in a highly effective manner.

It is yet still another object of this invention to utilize the inherent benefit of rotary activation of an arcuately movable pusher arm, with such arm utilized in conjunction with a novel rotating power applying member and connecting rod arrangement, with the result that deceleration of arcuate motion near the end of both outstroke and return stroke of the elongate pusher arm will be accomplished in a highly desirable manner. Because the motion of the pusher arm and the attached article-engaging paddle are controlled by the attachment of the pusher arm to the rotating power applying member, the pusher arm and paddle will rapidly accelerate during the commencement of the push phase, then smoothly slow to a stop at the conclusion of the push phase and immediately accelerate in the return direction as the rotating power applying member continues to turn. The non-reciprocatory motion of the rotating power applying member is thus seen to be advantageous throughout the entire operation from the time of the pusher arm and the article-engaging device accelerating into the bag-pushing phase until these components smoothly approach the stop or "at rest" position.

It is yet still another object of this invention to utilize a rotating power applying member for a pusher device used with an elongate conveyor belt, with such rotating power applying member bringing about smooth motion of a rotatably mounted arm and article engaging device during the removal of an article from the conveyor belt as well as during the return of the arm and article engaging device to an "at rest" position, thus entirely avoiding the utilization of reciprocatory movement in the powering of the rotatably mounted arm.

It is yet still another object of this invention to provide a luggage diverting arrangement involving the use of a pusher paddle or luggage diverting device having its metal leading edge and remainder of its deflecting surfaces covered with foam rubber over which tough but pliable belting material is stretched. In addition, a link is anchored at its fixed end in commercially available rubber shock mounts. When the paddle or article-engaging device contacts a bag, the foam rubber and the shock mounts absorb impact forces associated with lateral acceleration of the article carried by the belt.

It is a yet further object of this invention to provide a novel, highly advantageous linkage associated with pusher paddle motion and orientation, such that assembly and adjustment time will be minimized, with a secondary effect being the reduction in life cycle maintenance and part replacement.

These and other objects, features and advantages will be apparent from a study of the appended drawings.

BRIEF DESCRIPTION OF DRAWINGS

FIG. 7 is a fragmentary view to a substantially enlarged scale of the components utilized immediately above the speed reduction device depicted in FIG. 5, with these components involving a cam and limit switch;

FIG. 8 is a view closely relatable to FIG. 7 and revealing the cam mounted upon the output shaft of the speed reduction device, and the limit switch operated by the cam;

FIG. 9 is a fragmentary view generally relatable to FIG. 5, with this view revealing the utilization of a limit switch actuated at the time the elongate pusher arm has returned to its "at rest" position;

FIGS. 11a and 11b, taken together, represent a block diagram of the significant electrical components of my device when multiple limit switches are utilized for controlling the return of the pusher arm to its at rest position; and FIGS. 12a and 12b, taken together, represent a block diagram of the significant electrical components of my device when a single, shaft-operated rotary encoder rather than two limit switches are utilized for controlling the return of the pusher arm to its at rest position.

DETAILED DESCRIPTION

Figure 1:
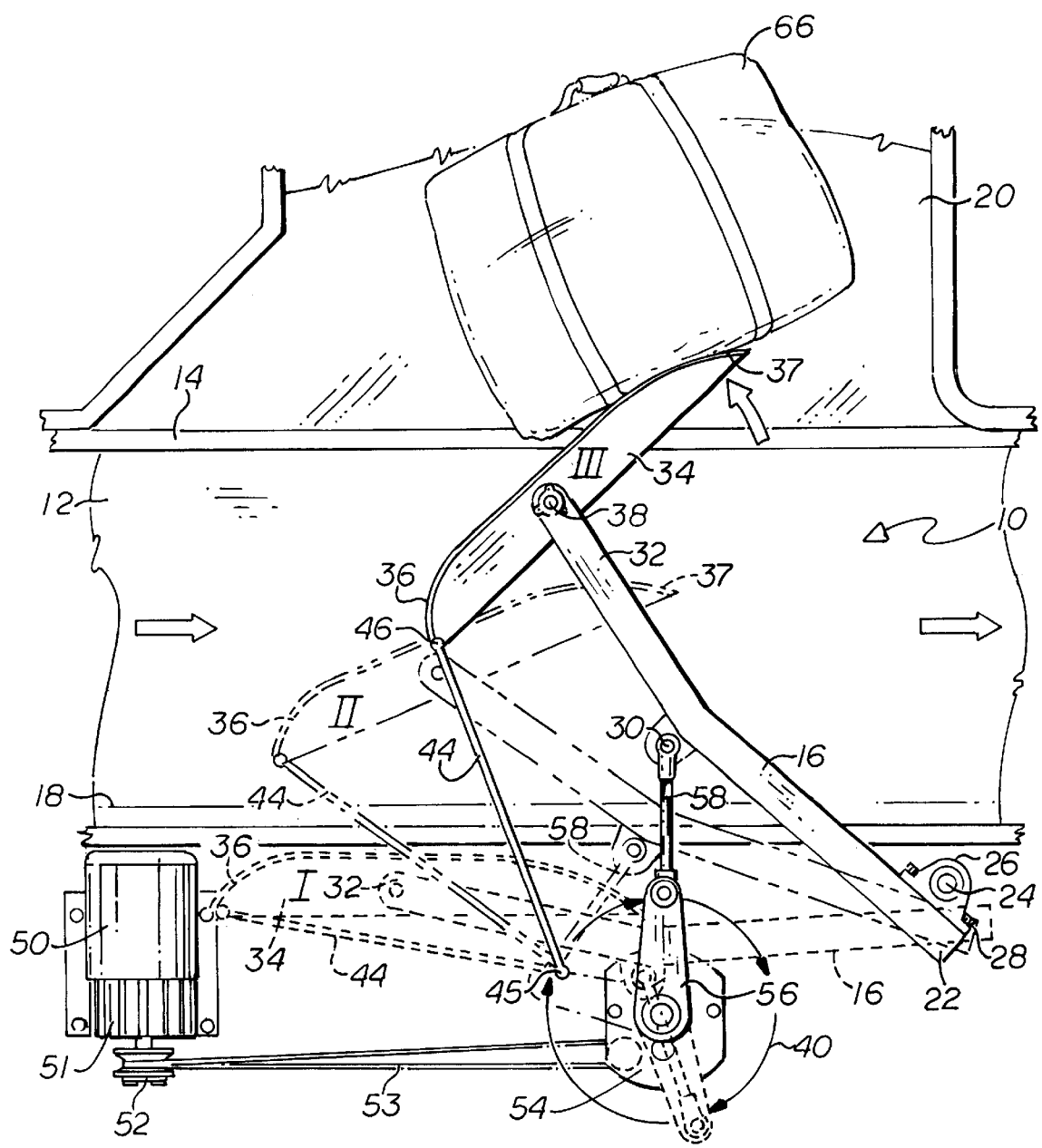
FIG. 1 is a view of an embodiment of my novel pusher device of the type utilized with a conveyor belt employed for moving articles such as luggage from one point to another, with dashed lines being employed for showing various positions into which an elongate, rotatably mounted pusher arm provided in accordance with this invention is caused to move during the deflection of a selected article from the belt into an adjacent chute.

With initial reference to FIG. 1 it will be noted that I have shown a pusher device 10 in accordance with this invention, which is intended for use with an elongate conveyor belt 12. The device 10 may also be referred to as a diverter device or a transfer mechanism. The conveyor belt 12 may be regarded as endless, with it being operably disposed on a generally horizontally extending support surface 14, and in the instance illustrated in FIG. 1, the belt 12 is depicted as moving from the left toward the right. As is typical in instances of this general type, the conveyor belt 12 is designed to move, usually at a constant speed, along the surface 14.

As is obvious, the purpose of the endless belt 12 in this instance is for transporting articles, such as luggage, from one location to another. However, it is to be understood that my novel pusher device or transfer mechanism is not to be limited to use with luggage, for it could equally well be used by an express mail service, a feed manufacturer, or still another endeavor involving tangible articles being moved along a conveyor belt to a particular destination.

From FIG. 1 it will be seen that my novel pusher device 10 principally utilizes an elongate, rotatably mounted pusher arm 16 that is attached to the underlying structure below the support surface 14 adjacent the long side edge 18 of the belt, but out of direct contact with the belt. For the sake of simplicity, FIG. 1 depicts only a single pusher device operatively associated with the endless conveyor belt, but as will afterward be discussed in conjunction with FIG. 10, it is typical for multiple pusher devices to be utilized in a spaced relationship along a conveyor belt, so that depending on the destination of a given bag, that bag can be pushed into the appropriate chute.

With continued reference to FIG. 1, it is to be understood that the pusher arm 16 is of sturdy construction having first and second ends, with the first end 22 being pivotally affixed to a pivotal mounting means 24. The pivotal mounting means 24 involves a shaft rotatably affixed to the support surface 14 and resides relatively close to the long side edge 18 of the belt 12 but out of contact with the belt. The mounting means or shaft 24 typically involves the use of one or more ball bearings 25 operatively disposed in a housing 26 secured to the pusher arm 16 by the use of bolts 28 or the like. Also to be noted with regard to the pusher arm 16 is an attachment point 30, to which the actuating means for the arm, discussed hereinafter, is operably attached. The attachment point 30 is typically located in the approximate midpoint of the side of the pusher arm 16.

Upon the second end 32 of the pusher arm 16 is mounted an article-engaging device or deflecting element 34, the construction and operation of which will shortly be described at greater length. It is the purpose of the article-engaging device or paddle 34 to deflect an article carried by the endless belt 12 into a selected chute 20 located on the opposite side of the belt 12 from the mounting location for the pusher arm 16. However, instead of a chute, my novel device may be utilized for deflecting an article carried by the belt 12 into another location, such as onto an ancillary conveyor belt operatively disposed at an angle to the direction of travel of the endless belt 12.

It is important to understand that my novel rotatably mounted pusher arm 16 is arranged to rotate in a closely controlled manner about the pivotal mounting means 24, with the pusher arm, during its normal operation, typically rotating less than 90°. It will be noted in the instance depicted in FIG. 1 that I have shown the pusher arm 16 in full lines to denote its fully extended position when it is serving to push the item, such as a piece of luggage 66, into the selected chute or other location 20. I may refer to this position of the pusher arm as Position III.

Also to be noted in FIG. 1 is the position of the pusher arm 16 when it is in its inactive or retracted position, with dashed or phantom lines being utilized to show the pusher arm in such position, in which it is disposed in general alignment with the long side edge 18 of the belt 12, with the article-engaging device or paddle 34 residing relatively close to the edge 18. I may refer to this as Position I of the pusher arm 16.

Also shown in dashed lines in FIG. 1 is the pusher arm 16 in an intermediate position, which I prefer to call Position II. When the pusher arm is caused to rotate as a result of the functioning of the power applying arrangement or actuating means described in some detail hereinafter, the pusher arm moves between the retracted position, Position I, and the fully extended position, Position III, and at that time it passes rapidly, without interruption, through Position II. By way of example, by the time the arm 16 has rotated to Position II, it may have been rotated approximately 22.5°, whereas by the time the arm has rotated to Position III, it may have been rotated approximately 45°. Quite obviously, I am not to be limited to either of these rotational angles.

As will afterward be discussed, a rotating power applying member 56 forms a principal aspect of the power applying arrangement or actuating means, and when the actuating means has been activated, the second end 32 of the pusher arm 16 is caused to extend from the inactive position, across at least a portion of the endless belt 12 so as to bring about the article-engaging device or paddle 34 coming into contact with a selected article carried by the belt. A typical article 66 carried by the belt 12 is depicted throughout these several figures.

With further reference to the article-engaging device or deflecting element 34, I prefer for this deflecting element to be generally in the configuration of an airfoil, with the leading edge 36 of the device 34 being somewhat thicker than the trailing edge 37 of this device. To prevent binding, I typically utilize one or more ball bearings at the location where the article-engaging device or paddle 34 is attached to the second end 32 of the pusher arm 16. The bearings are contained in a suitable bearing housing 38 bolted in an operational manner to the article-engaging device 34.

It will be noted in FIG. 1 that I have not in this instance illustrated the actuating means or power applying arrangement in detail, but rather have shown a circle 40 created by the use of dashed lines, with this circle being intended to indicate the path of motion of the crank 56, also known as a rotating power applying member. The rotating power applying member 56 is clearly shown in FIG. 1, and it is to be understood as being an intrinsic part of the means I utilize for causing the pusher arm 16 to move successively from Position I through Positions II and III and thereafter back to Position I, with this advantageously being accomplished without the use of reciprocating motion. In other words, it is intended that by the functioning of the rotating power applying member 56, the pusher arm 16 is caused to return to Position I, the inactive position, after the selected article 66 has been removed from the belt 12 and inserted into the selected chute 20.

Continuing with FIG. 1, it will be noted that I have shown an elongate link or restraint member 44 of fixed dimension extending between a fixed location 45 attached to the pusher frame and the leading edge 36 of the article-engaging device 34. The elongate link 44 is pivotally connected at 46 to the leading edge 36 of the deflecting paddle 34. It will be noted from FIG. 1 that this elongate link 44 is shown in Position II to have moved in rotation as a result of the rotation of the pusher arm 16, and this link will rotate still further as a result of additional rotation of the pusher arm 16, as revealed in Position III.

As will be hereinafter discussed, it is the function of the elongate link or restraint member 44 to limit, in a highly desirable manner, the rotation of the article-engaging device 34 with respect to the pusher arm 16 when this arm moves from Position I into Position II, and to cause still further rotation of the article-engaging device 34 when the pusher arm 16 moves from Position II into Position III.

By having specifically referred to these three positions of the pusher arm 16 and of the article-engaging device 34 is not to imply that the pusher arm 16 moves abruptly from Position I into Position II, or to imply that the arm moves abruptly from Position II to Position III. In reality, the operation of my device is such that the rotative movements of the pusher arm 16 about the pivotal mounting means 24 are smooth and uninterrupted. Likewise, the movements of the article-engaging device or paddle 34 about the second end 32 of the pusher arm 16 are smooth and uninterrupted, with the rotation of the device 34 through the several positions depicted in FIG. 1 being of consequence to this invention in that such rotation of the article-engaging device will optimally orient an article 66 carried on the belt 12 for discharge into the chute 20.

Figure 2A:
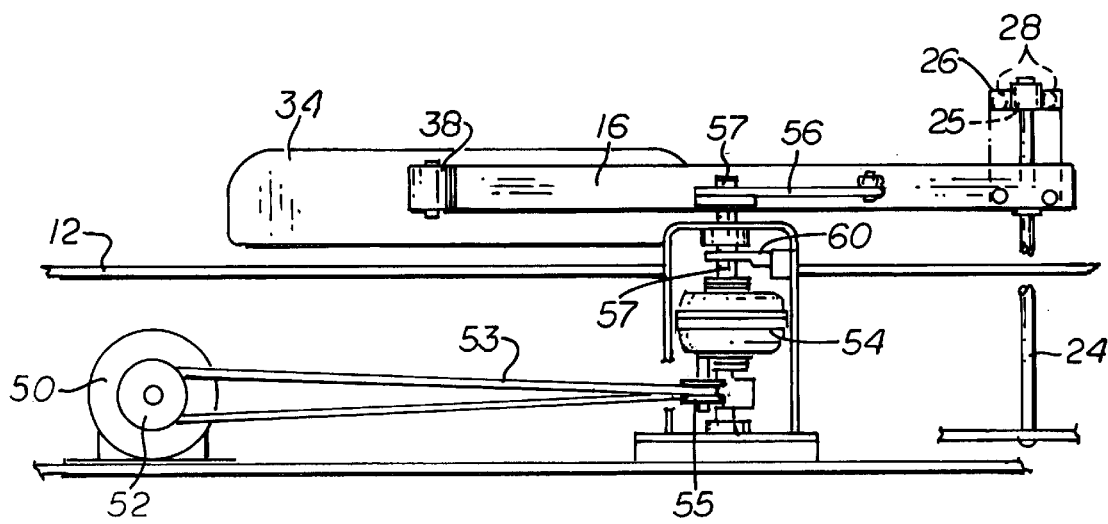
FIG. 2a is an elevational view closely relatable to FIG. 2, and showing that the article-engaging device or deflecting element is mounted above the level of the conveyor belt with which my device is used, with this view also showing a type of power applying means using rotary rather than reciprocatory type motion for operating the arm and the article-engaging device.
Figure 2:
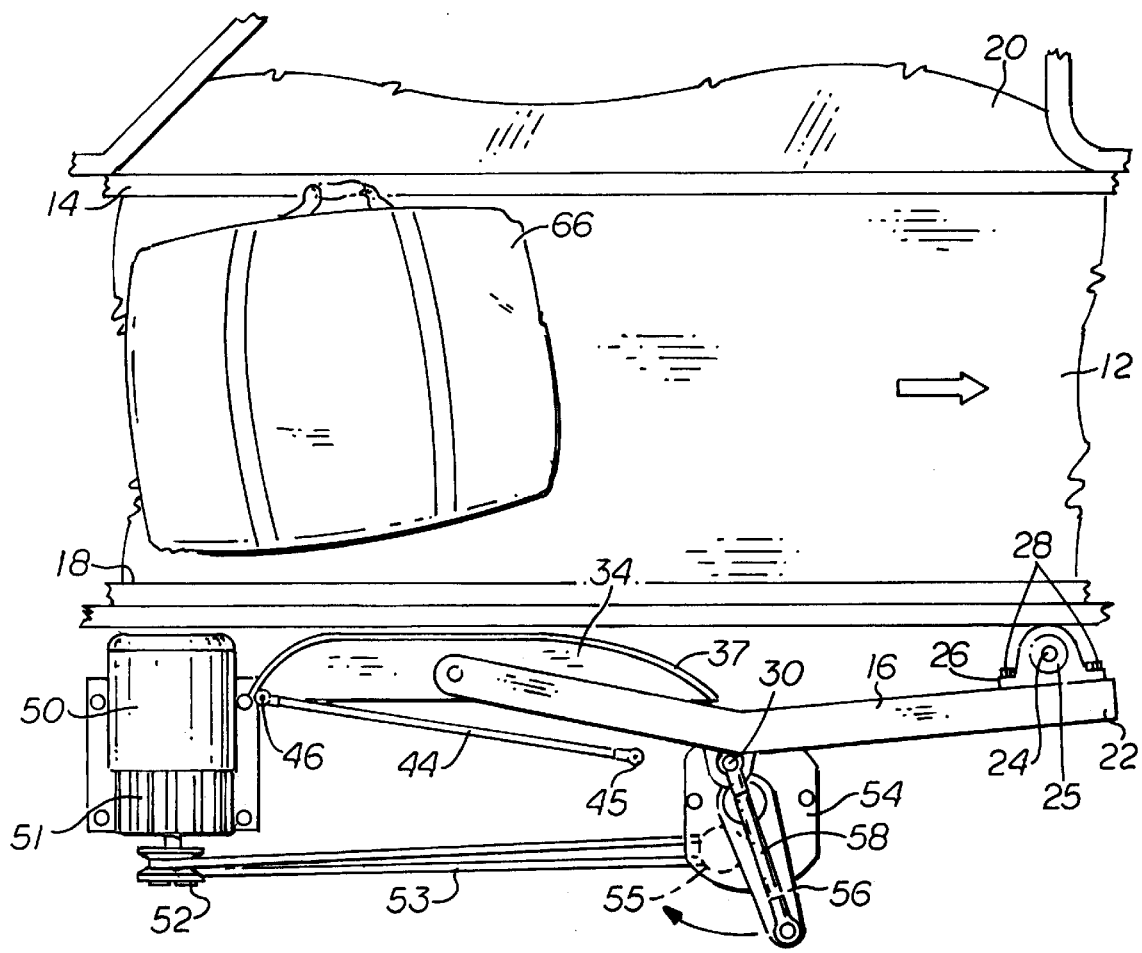
FIG. 2 is a plan view to approximately the same scale as FIG. 1, but here showing in full lines, the article-engaging device or deflecting element in the retracted or "at rest" position.

Turning now to FIG. 2, it will be seen that in this figure I have revealed further details of a first type of actuating means or power applying arrangement I preferably utilize for bringing about the controlled rotative movements of the pusher arm 16 about the pivotal mounting means 24 that is affixed to the support surface 14, such that a selected article 66 being carried along by the endless belt 12 will be contacted in an optimum manner by the paddle 34. It will also be observed from FIG. 2 that the article-engaging device or deflecting paddle 34 is in this instance in its inactive position, which of course corresponds to Position I depicted in phantom lines in FIG. 1.

Illustrated in FIG. 2 is one type of power applying arrangement or power supplying device 50 utilized for bringing about rotative movements of the pusher arm 16 in the previously described manner, and in the illustrated instance, the power supplying device 50 is an electric motor. If an electric motor is utilized, it typically is a three phase motor of one to two horsepower, although I am obviously not to be limited to this. As an alternative to the use of an electric motor, I may utilize a hydraulic motor or a pneumatic power supplying arrangement, but these are not preferred.

The output of the motor 50 is provided to a clutch/brake 51 of conventional construction, and for example the clutch/brake can be a device operated at 90 volts DC manufactured by a company such as Warner Electric Co. or Rockwell-Automation Dodge. In accordance with the construction of such devices, the brake is released when the clutch is energized to permit rotative motion to be transmitted, but with the brake being energized to cause the rotative motion to promptly cease at such time as the clutch has been de-energized.

Figure 11A:
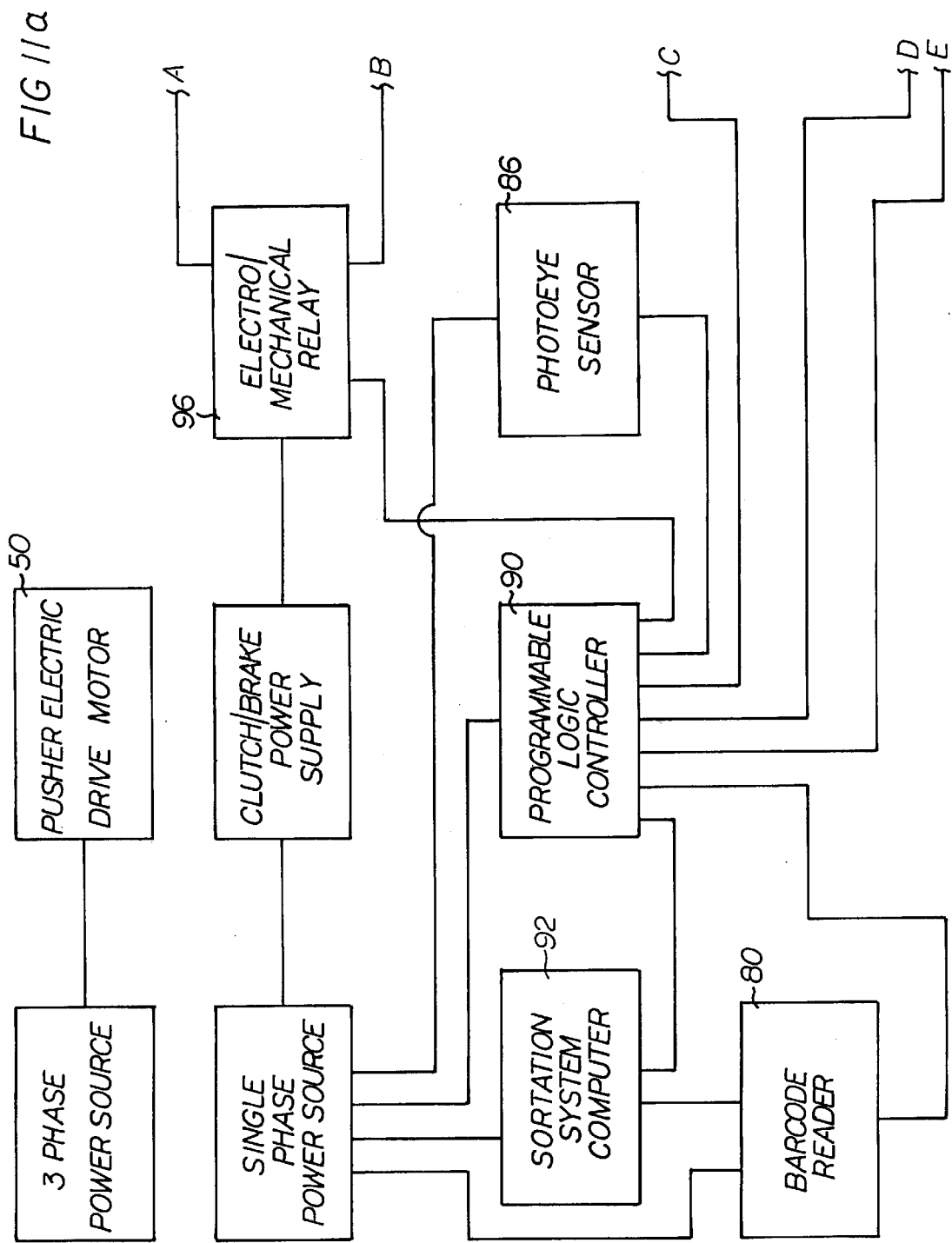

The selective energizing of the brake and the de-energizing of the clutch at the proper time is controlled by a relay 96, which is illustrated in FIGS. 11a and 12b, with this subject to be discussed at length hereinafter.

Because the motor 50 has a rotative speed far greater than the desired rotative speed of the actuating means utilized for bringing about rotation of the pusher arm 16, I utilize a speed reduction device 54, as illustrated in the vicinity of the pusher arm 16 in several of the figures, including FIGS. 2 and 2a. The speed reduction device is driven in rotation by means of an elongate drive belt 53 passing around a suitable pulley 52 mounted upon the output shaft of the clutch/brake 51, and around a pulley 55 mounted on the input shaft of the speed reduction device 54; note in particular FIG. 2a.

It will be recalled that in FIG. 1 was illustrated the rotating power applying member 56 to which the output of the speed reduction device 54 is delivered. From FIG. 2a it will be seen that the rotating power applying member 56 is operably connected to the upper end of the output shaft 57 of the speed reduction device 54, with it being the purpose of the rotating power applying member 56 to rotate at a constant speed and to selectively apply motion to the pusher arm 16 when the brake of the clutch/brake 51 has been released, and the clutch portion has been energized. This arrangement advantageously avoids the use of reciprocatory motion for powering the pusher arm 16.

Figure 3:
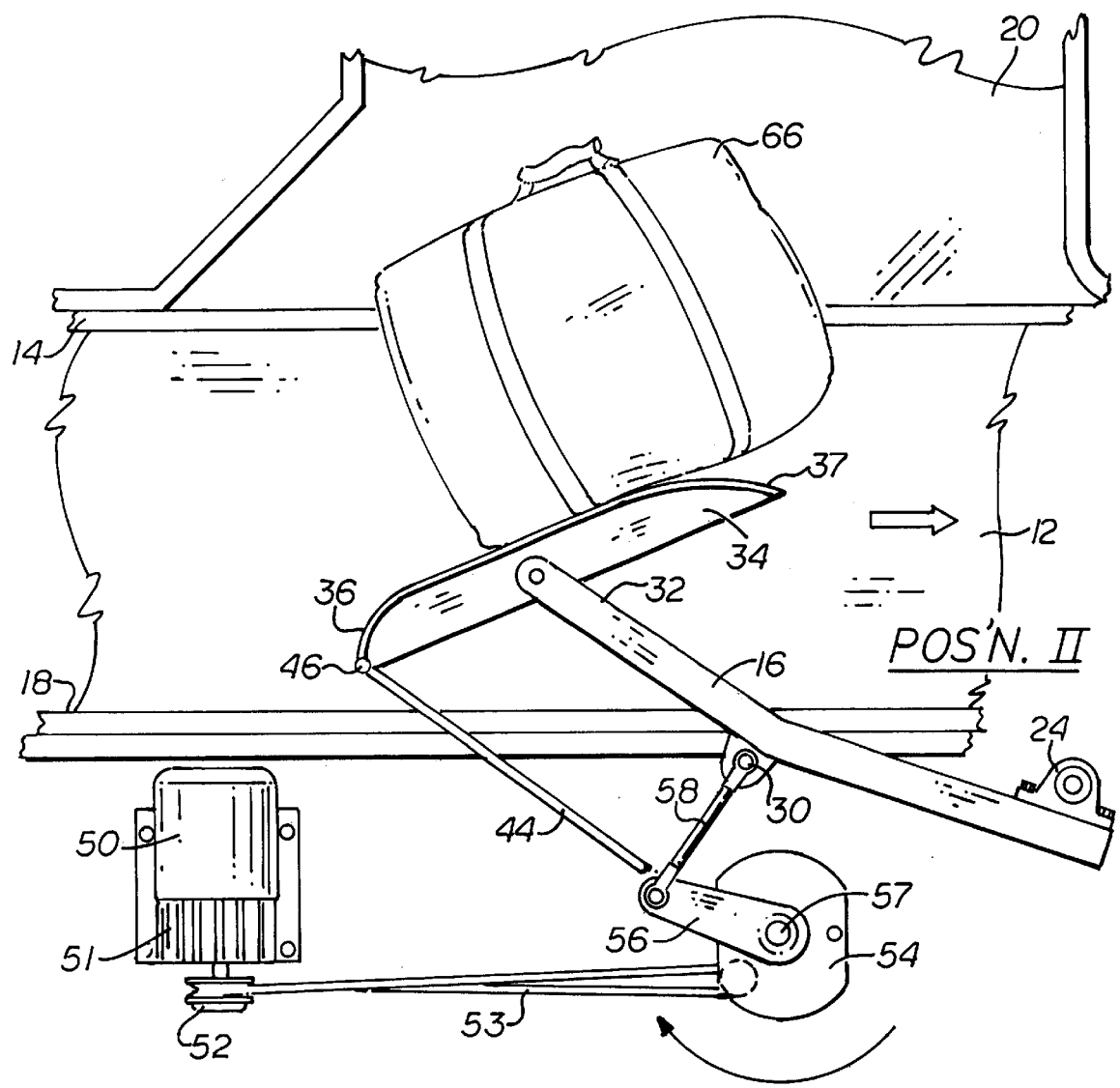
FIG. 3 is a view related to FIG. 2, but here showing the use of a rotating power applying member responsible for bringing about sufficient rotation of the elongate, rotatably mounted pusher arm as will cause an article such as luggage carried by the conveyor belt to be contacted by the deflecting element or paddle in a correctly timed relationship.
Figure 4:
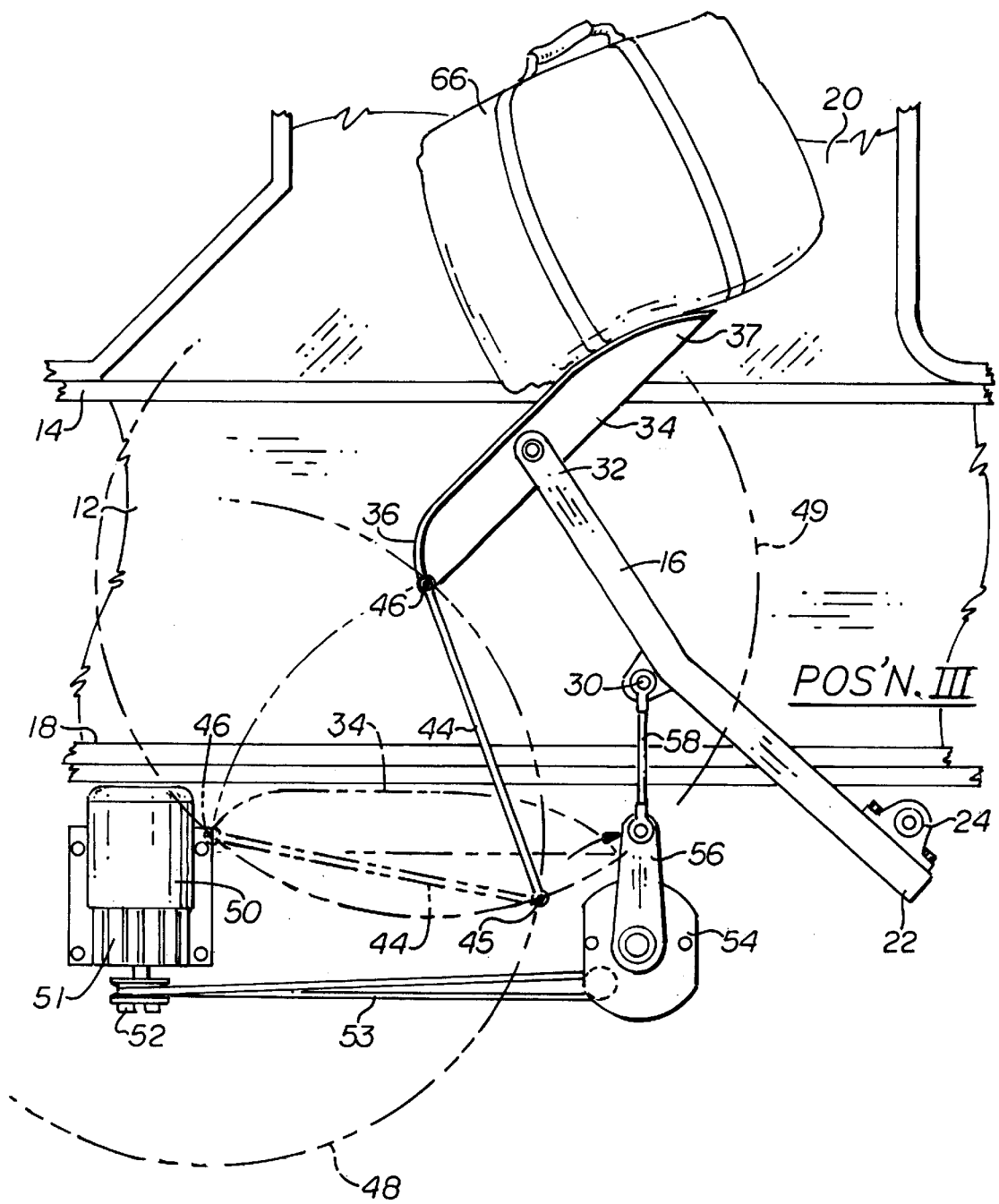
FIG. 4 is a view related to FIGS. 2 and 3, but here showing the rotating power applying member having rotated to its fully extended position, thus to bring about outward rotation of the rotatably mounted pusher arm to its fullest extent, as will cause the article of luggage carried by the belt to be thrust into the selected chute, with this view also utilizing intersecting circles that serve to locate a pivot point at which a restraint member for the paddle is mounted.

It will be noted from FIGS. 1 and 2 that the outer end of the rotative actuating arm or rotating power applying member 56 is in turn connected to an actuating link 58, with this link being visible in a particularly clear manner in FIGS. 3 and 4. The end of the link 58 remote from the rotating power applying member 56 is in turn connected to the previously-mentioned attachment point 30 located approximately at a mid portion of the pusher arm 16.

It is important to note from FIG. 2 that in this FIG. 1 clearly show the fixed pivot location 45 at which one end of the elongate link 44 is pivotally connected. The location 45 is strategically placed, being established at an intersection of two rather large circles 48 and 49 drawn in FIG. 4 by the use of dashed lines. The elongate link 44 is of fixed length, and it serves as a restraint member responsible for causing the article-engaging device or paddle 34 to assume a zero angle at Position I; the angle of approximately 45° at Position III; as well as all of the positions in between Positions I and III.

As should be apparent from observing FIG. 3 in comparison with FIG. 2, the rotating power applying member 56 has been caused to move in a clockwise direction more than 90° away from the position of this member shown in FIG. 2. This rotation of the arm or member 56 necessarily causes upward motion of the actuating link 58. As a result of this motion, the pusher arm 16 is caused to move in a highly desirable rotative manner about the pivotal mounting means 24, so as to bring about motion of the second or outer end 32 of the pusher arm 16 into Position II, as depicted in FIG. 3.

It is to be noted that because of the provision of the previously-mentioned elongate link 44, one end of which attaches to the fixed pivot location 45 best seen in FIGS. 2 and 4, and the other end of which attaches at 46 to the forward end of the article engaging device or paddle 34, the motion of the paddle 34 is closely controlled in a highly advantageous manner.

In other words, the leading edge 36 of the paddle 34 is prevented by the elongate link 44 from moving in an unrestrained manner across the endless belt 12. Because of this restraint applied by link 44 to the forward edge 36 of the paddle 34, the trailing edge 37 of the paddle 34 moves across the belt to a more pronounced extent, thus bringing about a controlled, highly desirable motion that is transmitted to the article 66 carried upon the belt 12.

It is important to note that the motion of the paddle 34 is consistent with the direction of travel of the conveyor belt 12, and it travels with respect to the belt at a speed that is commensurate with the speed of the belt.

It will be seen that as a result of this highly desirable arrangement, the luggage 66 is contacted by the paddle 34 and then moved at a moderate and controlled rate of speed, with the luggage being accelerated to a higher lateral rate of speed near the end of the push phase, which is depicted in FIG. 4. As will later be discussed, after the luggage has been pushed off of the conveyor belt, the rotatably mounted pusher arm 16 and the paddle 34 will advantageously be returned to their "at rest" positions at a higher average speed than the speed of the initial contacting of the luggage by the paddle 34.

Turning now to FIG. 4, it will be seen that the rotating power applying member 56 has been moved to its fully extended position, with this of course likewise causing the actuating link 58 to be moved into its fully extended position, thus to bring about maximum rotation of the pusher arm 16 about its pivotal mounting means 24. The arm 16 may in this instance have been rotated approximately 45 away from its inactive position depicted in FIG. 2, but I am obviously not to be limited to this amount of rotation.

In FIG. 4 it will be noted that because of the connection of the previously-mentioned elongate link 44 at 46 to the leading edge 36 of the paddle 34, this part of the paddle 34 is prevented from moving any further than the approximate mid point of the endless belt 12. Because of this restraint of the leading edge of the device 34, the trailing edge 37 of the paddle moves for a pronounced extent, with this having the direct result of causing the article 66 to be pushed in a controlled, highly desirable manner into the previously indicated chute 20. Alternatively, the article 66 may be pushed onto an ancillary conveyor belt disposed at a distinct angle to the path of motion of the belt 12.

The previously mentioned, relatively large circles 48 and 49 depicted in FIG. 4 were in each instance drawn from the connection point 46 located at the forward end of the paddle 34, with one of these circles having been drawn from the point 46 as the paddle 34 resides in its "at rest" position, and the other circle drawn when the paddle is in its fully extended position. Although it is obvious that there are two intersection points of these two circles, it is the intersection point 45 nearest the speed reduction device 54 where the link or restraint arm 44 is optimally mounted.

The speed reduction device 54, when the clutch portion of the clutch/brake 51 has been energized, will apply a consistent circular motion to the rotating power applying member 56, with the rotational direction in this instance being clockwise, as indicated by the curved arrows in the various figures of drawing. It is to be understood that the outer, link-contacting end of the rotating power applying member 56 moves smoothly in a circular orbit, with this having the result of causing the pusher arm 16 to commence outward movement in a highly effective article-contacting manner. As has already been explained, the continued rotation of the rotating power applying member 56 causes the immediate retraction of the pusher arm 16 as soon as the push phase has been completed, with the return of the pusher arm to the inactive position being accomplished at a higher average speed than was the movement of the pusher arm in the article-contacting direction.

It should be mentioned at this point that it is much more desirable to terminate the outstroke of the pusher arm 16 as a consequence of the continuing rotary motion of the rotating power applying member 56 instead of following the prior art teachings, which would have dictated bringing the pusher arm 16 to a complete stop by stopping the power-supplying arm, then having to reverse the drive system in order to return the pusher arm 16 to its at rest or inactive position shown in dashed lines in FIG. 4. As previously mentioned, the novel arrangement in accordance with this invention advantageously avoids the use of reciprocatory motion.

It is important to realize that the rotating power applying member 56 brings about an inherent deceleration of the pusher arm 16 as the member 56 approaches the outstroke position depicted in FIG. 4. In the preferred embodiment, the rotating power applying member will have rotated approximately 196° by the time it has reached this outstroke position. Furthermore, inherent and highly desirable deceleration of the pusher arm 16 is also brought about as the rotating power applying member 56 has rotated back approximately 164° to the "at rest" position depicted in FIGS. 2 and 6. This inherent deceleration reduces the load placed on the brake I prefer to employ, thus increasing the wear life of the brake. The wear life of the clutch portion is also extended due to the fact that little motion of the pusher arm 16 and paddle 34 occur during the first few degrees of rotary power applying member 56 rotation, thus allowing rapid acceleration of the power applying components under minimum load conditions.

It is significant to note that because the rotating power applying member 56 must rotate back only approximately 164° in order to cause the pusher arm 16 to return to the "at rest" position, this obviously takes place more rapidly than does movement of the arm 16 in the outward direction, when the rotating power applying member 56 must rotate approximately 196° in order to accomplish outward movement of the pusher arm 16 and the paddle 34.

Figure 5:
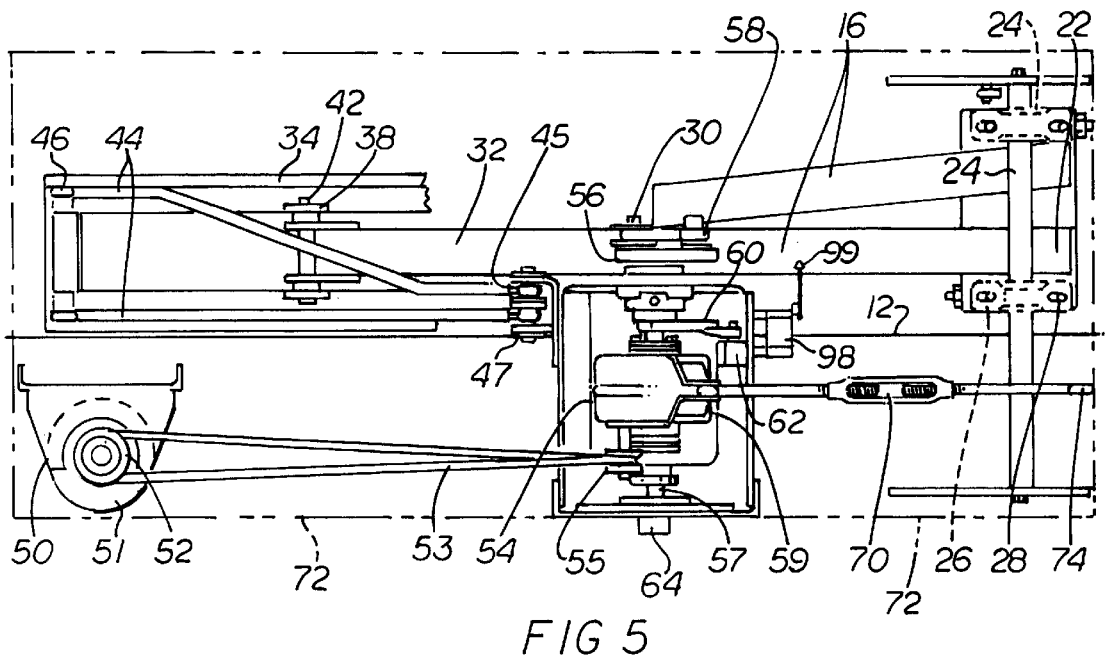
FIG. 5 is a side elevational view of the principal embodiment of my invention, with certain parts removed to reveal the utilization of a speed reduction device provided in order to drive the rotating power applying member at an appropriate speed.
Figure 6:
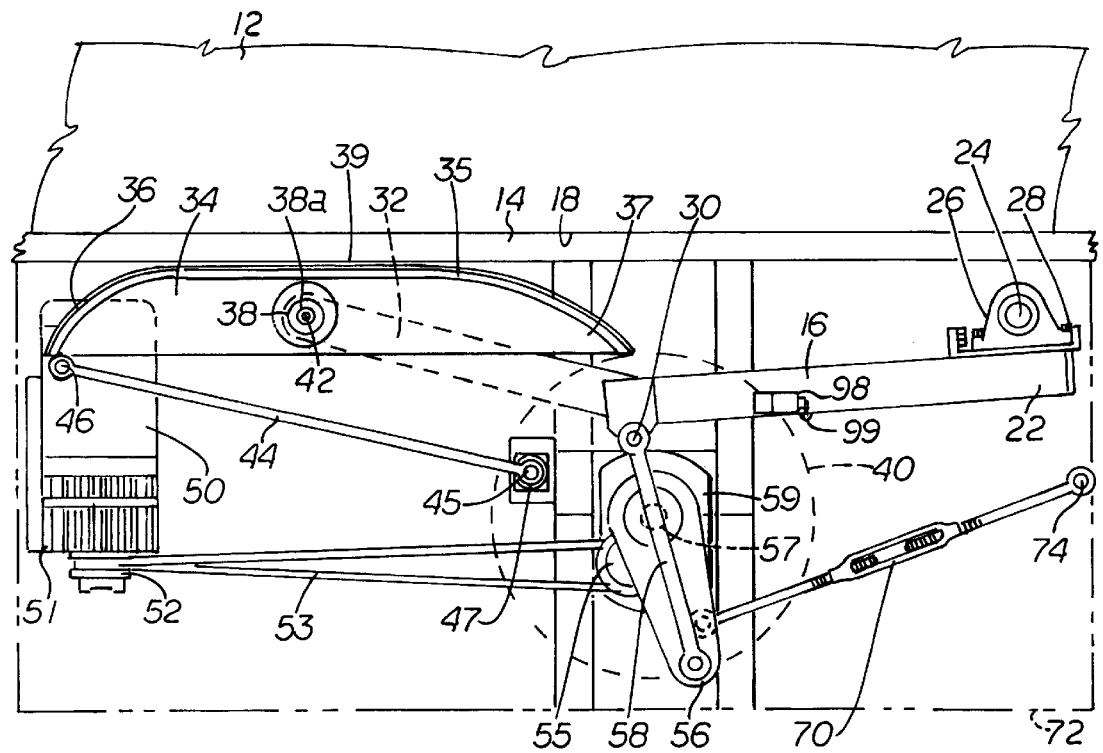
FIG. 6 is a plan view bearing some relationship to FIG. 2, but here showing additional detail of mechanical components and a framework or housing utilized to operably mount those components.

Turning now to the embodiment of my invention illustrated in FIGS. 5 and 6, it will be seen that I have illustrated an arrangement generally similar to that described in the previous figures, but with certain additions of detail that are intended to depict an actual pusher device.

It will be noted from FIG. 5 that the belt 12 resides in a perpendicular relationship with respect to the plane of the paper, or in other words, only the edge of the belt 12 is visible in FIG. 5. In this figure the speed reduction device 54 is shown with its shaft 57 residing in a vertical attitude. Affixed to an upper portion of the output shaft is the rotating power applying member 56.

The pulley 55 on the input shaft of the speed reducer 54 resides close to the supporting surface, as is apparent from FIG. 5, with power being supplied from motor 50 and clutch/brake 51 by means of the previously-mentioned elongate drive belt 53. Because the output pulley 52 of the clutch/brake rotates about an axis displaced 90° from the axis rotation of the input pulley 55 to the gear reducer, it is necessary for there to be a twist in the elongate belt 53. Although a twist sometimes adds stress to a "V" belt, this stress is reduced as the belt is lengthened. As borne out by tests conducted by certain belt manufacturers, relatively long belts, even those containing a twist, can be expected to have long life.

It will be observed that FIG. 6 bears certain similarities to FIG. 2, but quite obviously reveals the utilization of several additional components, such as the presence of a layer of closed cell foam rubber 35 secured to the upper surface of the paddle 34. The use of the foam rubber minimizes damage to luggage or other items at the time they are being removed from the conveyor belt 12. I prefer to cover the paddle 34 with relatively heavy belting material 39, to prevent damage to the layer of foam rubber.

To counteract the force of the elongate drive belt 53, I find it desirable to utilize a turnbuckle 70, as is apparent from FIGS. 5 and 6. The turnbuckle functions in two principal ways:

1. When the output torque of the speed reduction device 54 causes the rotating power applying member 56 to rotate, thus moving the pusher arm 16 and paddle 34, there is an equal and opposite force applied to the case 59 of the speed reduction device. This force is counteracted by the turnbuckle 70, one end of which is attached at 74 to the pusher frame 72.
2. The "V" belt 53 must be properly tensioned to transmit AC motor power from the clutch/brake output sheave 52 through the belt to the input sheave 55 of the speed reduction device. This tension is minutely adjustable by means of the turnbuckle 70 connected between the gear case 59 and pusher frame 72.

As previously mentioned, it is preferable to have an AC motor 50 powering the pusher arm 16, with this motor being designed to rotate constantly whenever the conveyor belt 12 is in operation, which can be eighteen to twenty hours a day. If there are slow periods during the day, the conveyors and pushers may of course be shut down, with the decision as to such operation varying from application to application.

It is to be understood that the "V" belt 53 is called upon to transmit motor power to the speed reduction device 54 only when an article, such as a piece of luggage 66 is designated for the chute associated with the particular deflecting element or paddle 34, and most importantly, this power is to be transmitted when the deflecting element or paddle 34 is at the optimum position in relation to the item of luggage 66 traveling along the belt. At the precisely correct time, the brake responsible for restraining the motion of the pusher arm 16 and paddle 34 is de-energized, and the clutch is energized, with this causing the sheave or pulley 52 mounted on the clutch/brake to rotate. As previously explained, the "V" belt 53 then transmits motor power to the reducer input sheave 55 of the speed reduction device 54, bringing about the consistent rotation of the rotating power applying member 56, and in turn the highly desirable motion of the pusher arm 16 and the luggage contacting device or paddle 34.

It is clear from the foregoing that I do not prefer to utilize a rigid transmission of power arrangement, such as would be involved, for example, in a direct connection from spur gear to spur gear. The arrangement utilizing a "V" belt is obviously more elastic. As a result of this construction, my invention advantageously provides a substantial amount of highly desirable shock reduction, which is of course inherent in "V" belt drives.

Other details to be noted in FIG. 5 include the fact that the previously-mentioned pivotal mounting means 24 may be of substantial length, with the housing 26 involving components spaced comparatively widely apart. Also revealed in FIG. 5 is the fact that instead of the elongate link 44 being a single member, it may involve a pair of members, with there being a spaced apart pair of connection points 46 where the link members attach to the leading edge 36 of the deflecting element or paddle 34. It will be noted from FIG. 5 that the opposite ends of the pair of link members 44 attach to shock mounts 47 disposed at the previously-described fixed location 45.

Figure 12A:
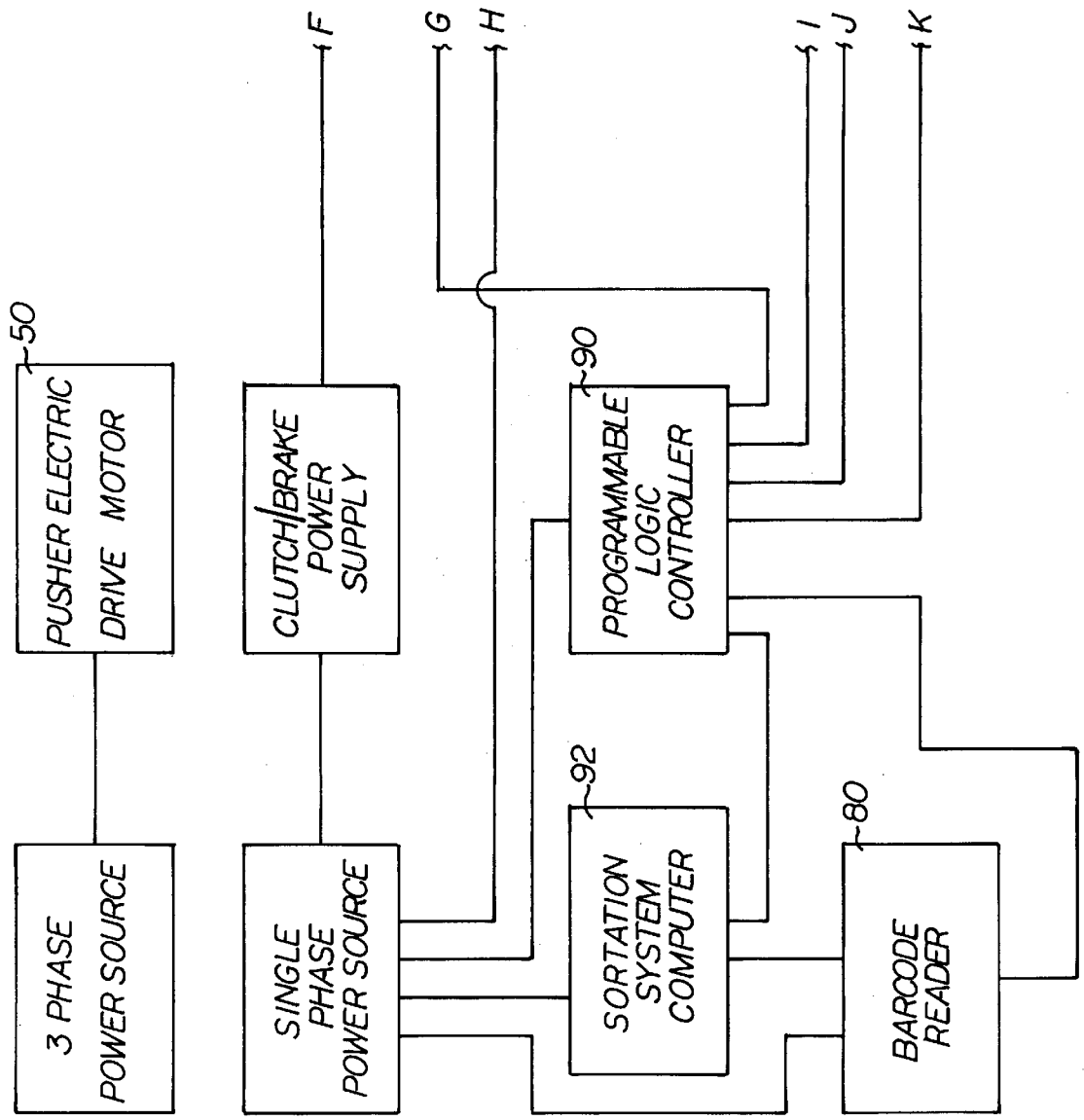

Additionally depicted in FIG. 5 is rotary encoder 64, which is typically attached via its external shaft to a bored opening in the lower end of the output shaft 57 of the speed reducer 54. The rotary encoder, which is also shown in FIG. 12b, is preferably utilized with a programmable logic controller 90. A controller of this type, hereinafter referred to as PLC 90, is illustrated in FIGS. 11a and 12a, and it functions to cause the clutch portion to be de-energized and the brake portion of the clutch/brake device 51 to be applied at such time as the rotating power applying member 56 is approaching the "at rest" or retracted position shown in FIG. 2, to assure highly accurate positioning of the paddle or deflecting element 34 in its retracted position. It will be noted that in FIGS. 11b and 12b I have shown the clutch portion as 51a and the brake portion as 51b. Other details of such arrangements will be discussed hereinafter.

It is to be realized that means already in use in this art may be utilized for causing the selective removal of luggage or other articles from a conveyor belt, which means can involve the use of a barcode actuation arrangement for bringing about the deflection of certain articles from the belt, or may utilize a switch actuated by an attendant in order to accomplish the selective removal of items from the belt. Such options will be discussed later.

With regard to still further detail illustrated in FIGS. 5 and 6, it is to be noted that the pusher paddle or article engaging device 34 may be rotatably attached to the second end 32 of arm 16 through use of two Dodge 3 bolt SL (light) ball bearings 38a. As viewed in FIG. 5, a 1" diameter shaft 42 passing vertically through the second end 32 of arm 16 is attached to the inner races of upper and lower bearings 38a whose outer races are bolted via bearing housing 38 to the upper and lower frame panels of the pusher paddle 34. The 1" shaft 42 attached to arm 16 does not rotate with respect to that arm.

The article-contacting device or paddle 34 is essentially in a friction-free relationship with the pusher arm 16 mounted on the shaft by virtue of the use of the two 3 bolt ball bearings 38a which hold the paddle in a horizontal plane as the arm 16 carries the paddle through its push cycle. Minor adjustment of the paddle horizontal angle may be accomplished using the bolts attaching the bearing to the paddle frame panels.

With reference to FIGS. 1, 2, 3, 4 and 6, I prefer for rotation of the paddle 34 about its vertical axis during the push cycle to be 0° with respect to the conveyor centerline "at rest," and approximately 45° with respect to the conveyor centerline at the full stroke position depicted in FIG. 4. This rotation is accomplished by the appropriate choice of the location of the fixed point 45 and the length of link 44. The strategic position of the fixed point 45 is established at one of the intersections of the two large, previously mentioned circles 48 and 49 depicted in FIG. 4. These choices are critical to the selection of the desired rotational angle.

Although FIG. 5 shows a considerable amount of pertinent information, I find it desirable to reveal a portion of the subject matter of this figure in even greater detail, with this detail being set forth in FIG. 7. It will be seen from FIG. 7 that affixed relatively near to the upper end of output shaft 57 of the speed reducer I may utilize a cam 60, which I may also refer to as the limit switch actuator. The cam 60 may be seen in considerable detail in FIG. 8.

Operably disposed adjacent the cam 60 is a roller actuator arm 61, which is designed to be contacted by the cam 60 during the rotation of the cam with the output shaft 57. As is apparent from FIG. 8, the cam 60 has a smoothly curved external surface whose distance from the axis of rotation of the shaft 57 varies rather considerably.

The roller actuator arm 61 is operably attached to the limit switch 62, with the limit switch 62 being attached to the metal enclosure surrounding the speed reducer 54; note FIG. 7. The curvature of the cam 60 is to be understood as bringing about a desirable operation of the limit switch 62 when the roller actuator arm 61 is in contact with a high portion of the cam 60. In accordance with one easily understood embodiment of my invention, the limit switch 62 serves an important purpose in connection with the initial application of the brake causing the pusher arm 16 to stop at the "at rest" position depicted in FIGS. 2 and 6.

With reference to FIG. 9, it will be noted that I may utilize a second limit switch 98, which I may call the "home limit switch." The limit switch 98 is mounted so that its relatively small operating lever 99 will be contacted at such time as the pusher arm 16 returns to its "at rest" position; note also FIGS. 5 and 6. Upon the actuation of the second limit switch 98 taking place, this causes the brake to receive full voltage, bringing the arm 16 to a full and abrupt stop.

It is to be understood that at the time appropriate for a certain selected piece of luggage to be diverted off the conveyor belt 12, the output shaft 57 of the speed reducer 54 of the appropriate pusher is caused to undertake one 360° rotation, with the result that the rotating power applying member 56 rotates for a like amount at a consistent speed. This of course brings about motion of the pusher arm 16 in the previously described manner, with the result that the selected piece of luggage is caused to leave the conveyor belt and enter the respective chute. At this time the cam 60 attached to the shaft 57 also makes one revolution, and as the pusher arm 16 and paddle 34 are returning to the "at rest" position, the small roller on the end of the limit switch arm 61 contacts the active surface of the cam 60. As the rotation of the shaft 57 continues, the cam 60 moves the roller and the arm 61 until the actuator arm of the limit switch 62 rotates enough to bring about closing of an internal contact, which serves to terminate the clutch function and slow down the brake function, with less than full voltage being applied at that time to the brake. Then, when the actuating arm 99 of the second limit switch 98 is operated by the return of the arm 16 to the "at rest" position depicted in FIG. 9, the brake receives full voltage, bringing the arm 16 to a full and abrupt stop. I may refer to the braking brought about by the functioning of the limit switch 62 as "soft braking," and the braking brought about by the functioning of the limit switch 98 as "hard braking."

Although the above-described arrangement utilizing the limit switches is a fully operational procedure, a preferred arrangement for monitoring the rotation of the speed reducer shaft 57 is by the use of the previously mentioned multipulse rotary encoder 64, with initial slow down braking triggered by the encoder count and a home position signal being provided when the "at rest" position of the arm 16 has been reached.

Figure 10:
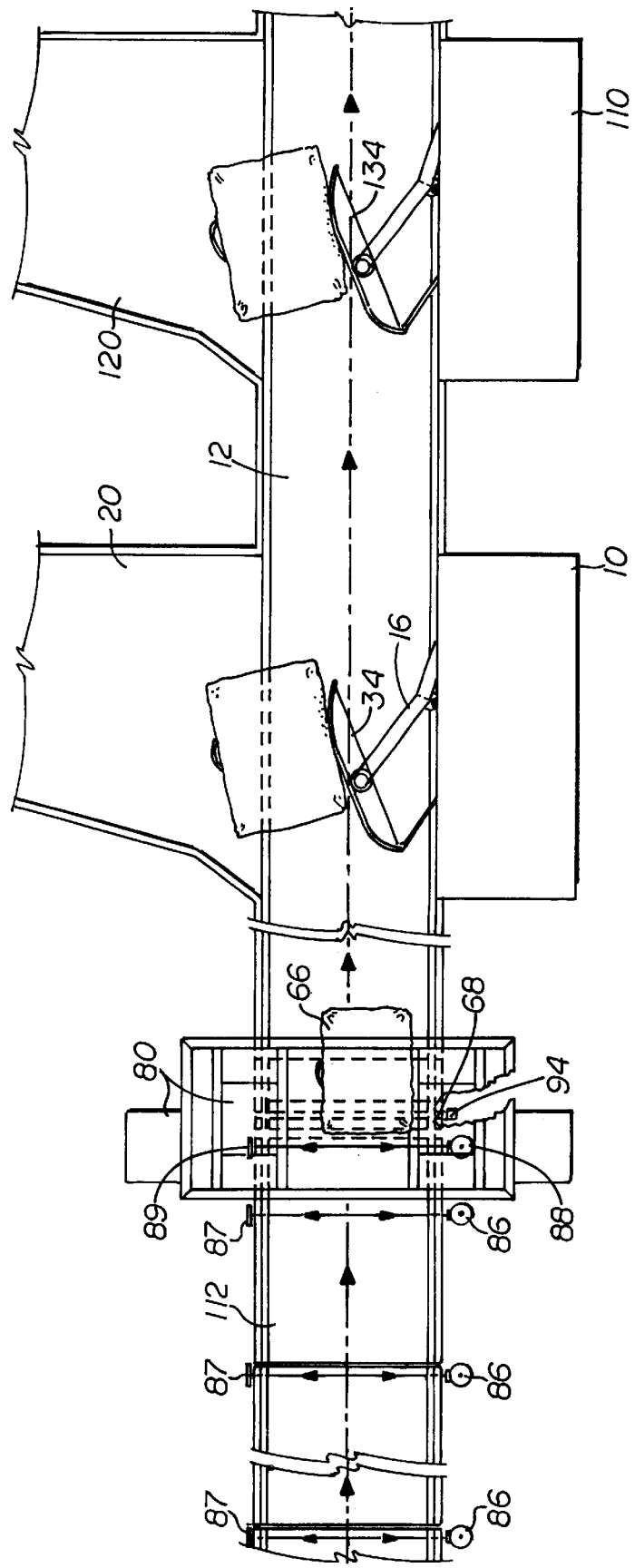
FIG. 10 is a plan view of a conveyor belt arrangement involving dual pusher devices or transfer mechanisms in accordance with this invention, with this view also indicating the components that are necessary in order that a certain piece of luggage will be pushed into the appropriate chute.

With reference now to FIG. 10, it is to be understood that the typical conveyor system employing my invention will utilize a plurality of pushers, but for the sake of simplicity, only two pusher devices, device 10 and 110 are being depicted in this figure, such that a diversion of luggage or parcels to adjacent conveyors or chutes 20 and 120, respectively, can be accomplished in a desirable manner.

As depicted in FIG. 10, I show a queuing belt 112 to the left of the conveyor belt 12, with these belts being deliberately spaced so that a 2" gap will exist therebetween. This arrangement makes it feasible to utilize a multi-laser barcode reader 80, with the gap or space between the conveyor belts 112 and 12 making it possible for the laser beams to scan a 360° circle around passing luggage. The barcode reader or other suitable device interrogates the tag identifying the bag and signals the aforementioned PLC 90 that a particular piece of luggage is to be diverted at a certain pusher, such as either the pusher 34 or the pusher 134.

Also utilized in FIG. 10 are a plurality of photoelectric sensors or photoeyes 86 aimed across the belt conveyor 112 and prior conveyors to respective photoeye reflectors 87. The several photoeyes are utilized in the separating and queuing of the bags traveling along the belts preceding the laser barcode reader 80.

Of particular interest is the photoeye 88 and its reflector 89 which are located within the confines of the barcode reader 80. This photoeye senses the leading edge of the piece of luggage, which sensing comes about as the result of the beam being blocked. Each signal is also relayed to the aforementioned Programmable Logic Controller 90. If a more precise definition of the luggage profile is required, the leading and trailing edges of the luggage are identified. From this the PLC 90 can determine the geometric center of this piece of luggage, and the appropriate pusher can cause it to be directed into the appropriate chute.

Additionally depicted in FIG. 10 as well as FIGS. 11*b* and 12*b* is a rotary encoding device 94, which device is capable of emitting multiple precisely spaced electric pulses, for instance 1 to 600 pulses/REV., which are to be received by a monitoring computer 92 or PLC 90. The monitoring computer and PLC are illustrated in both FIGS. 11*a* and 12*a*.

The rotary encoding device 94 may for example have an external shaft for connection to a centrally bored shaft of a head or tail belt conveyor pulley 68. As an alternative to this construction, the rotary encoding device 94 may be equipped with a wheel attached to its external shaft for the purpose of firmly contacting the return portion of the elongate belt 12 carrying a bag or parcel to the pusher devices. By return portion I intend to refer to the portion of the belt located on the underside of support surface 14. As the pulley shaft or wheel turns, pulses are emitted from the rotary encoder device, which are able to be related directly and accurately to belt movement.

It is also necessary to utilize a means for monitoring photoeye and encoder signals related to sensing and tracking the bag or parcel on the belt (via pulses). The device of choice is of course the previously-mentioned Programmable Logic Controller 90 depicted in FIGS. 11*a* and 12*a*, although a computer could be used if desired.

Regarding the operation of my novel device, when the leading edge or center of a certain piece of luggage having a particular destination has been established, the PLC 90 takes the electric pulse signals from the rotary encoder 94 and begins to count down from a preselected count value back to zero. At the zero count, the appropriate pusher is given the signal to push. Initial set up of the preselected count number can be approximated by multiplying the counts per revolution of the rotary encoder 94 times the revolutions of the encoder needed to span the distance between the photoeye 88 and the paddle of the appropriate pusher device or transfer mechanism. Quite advantageously, the count value can easily be adjusted in the PLC 90 by a technician. This makes it possible for the count number to be increased or decreased as may be necessary for accurate contact between a given pusher paddle and a particular piece of luggage 66. Early or late contact between paddle and luggage are thus greatly reduced.

As previously mentioned, the rotary encoder 94 may be attached to the tail pulley shaft 68, such that it will emit a constant number of pulses per revolution, or, alternatively, it may be equipped with a wheel on its shaft that is turned by the moving belt. Each pulse is equated to a distance that the piece of luggage travels as it is transported by the conveyor belt. When a predetermined number of pulses have been counted by the PLC 90, the correct pusher is triggered to push the luggage 66. Most advantageously, the number of pulses to the push signal can be changed by the computer technician (increased or decreased) in order that the timing of the "push cycle" can be fine tuned. Once triggered, the pusher operation is automatic, resulting in the designated piece of luggage being diverted to the appropriate chute or pier, following which the pusher paddle is returned in a highly desirable manner to the "at rest" or "ready" position.

Depending on the information contained on the barcode tag, the command from the sortation system computer or PLC is given to begin the push cycle. A relay 96 of the appropriate pusher is energized, resulting in contacts switching within that relay; the brake holding the pusher is de-energized, and the clutch is energized via the relay, causing the continuously running motor 50 of the appropriate pusher device or transfer mechanism to cause the rotating power applying member 56 to cause the respective pusher arm 16 to undertake its push phase. The item of luggage 66 in front of the pusher paddle 34 (or the pusher paddle 134) is pushed from the conveyor belt into the adjacent chute or pier.

As previously made clear, when the pusher arm 16 and the paddle 34 (or the pusher arm 116 and its paddle 134) reach the maximum extension governed by the length of the respective rotating power applying member 56 and actuating link 58, the respective paddle 34 or 134 comes to a momentary stop, then begins the retraction phase of the cycle, terminating at the "at rest" or "inactive" position. Advantageously, this motion is of course accomplished without utilization of any reciprocatory motion.

It has of course already been explained that once the clutch of the appropriate pusher motor 50 has been engaged via the switch contacts in the relay, motor power is applied constantly through the outstroke and retraction phases of the respective paddle until the respective rotating power applying member 56 approaches within a few degrees of its "at rest" position, at which time the clutch is de-energized and the brake applied. It has previously been made clear that a complete cycle is accomplished in a single 360° rotation of the rotating power applying member 56.

I prefer to use a suitable means for sensing the appropriate rotational degree of the output shaft 57 of the speed reducer to apply "slow down" braking and thereafter to apply "hard braking" to bring the pusher system components to a stop in the "at rest" position. It is to be noted that the rotary encoder 64 performs in one component, the functions of the two limit switches. The brake is an electromechanical device that responds to variations in excitation voltage, thus "slow down" braking is accomplished by applying low voltage whereas with hard or full braking, full voltage is applied. By trial and error I choose a point in the retract phase for the initiation by the rotary encoder 64 of the brake arrangement.

By now it should be apparent that by virtue of this highly advantageous construction, it is possible to accelerate a piece of luggage 66 to a higher lateral rate of speed near the end of the push phase. As the article engaging device or paddle 34 moves laterally across the belt 12, initial contact with the luggage 66 is at a low angle between the article engaging device or paddle 34 and the luggage, allowing the luggage to move along the face of device 34 as the belt 12 transports it. At the midpoint in the push phase the angle of the engaging device 34 may be approximately 21° to the belt 12.

After the mid point in the push phase, the rotation of the article engaging device or paddle 34 increases rapidly from 21° to 45°. This rotation coupled with the outward motion of rotatably mounted pusher arm 16 accelerates the luggage 66 to remove it from the belt 12 and support surface 14 to the chute 20. This arrangement meets the goal of contacting the luggage at a moderate rate of speed then accelerating the luggage near the end of the push phase. This is of course accomplished by strategic placement of the fixed point 45, about which the link 44 is rotatably mounted, and the proper selection of the length of the link 44 attached to the paddle 34.

As should now be apparent, I have provided a highly effective, readily affordable arrangement for the selective removal of objects from a conveyor belt by the use of a rotary mounted arm upon which an article-contacting device is operatively mounted, with the arrangement being such as to advantageously decelerate the motion of the arm near the end of both the outstroke and the return stroke of the arm, thus to effectively reduce brake wear.

I claim:

1. For use with an elongate conveyor belt designed to transport articles from one location to another, a pusher device mounted adjacent one long side of the belt, said pusher device utilizing an elongate, rotatably mounted arm having first and second ends, said first end being pivotally affixed at a location relatively close to the long side edge of the belt, with said arm being arranged to rotate about said fixed pivot for less than 90°, said arm normally residing in an inactive position extending along the long side of the belt, said second end of said arm being arranged to move outwardly, on occasion, from said inactive position and across at least a portion of the belt when an article is to be deflected off of the belt, an article-engaging paddle pivotally mounted on said second end of said arm, with said paddle being able to rotate with respect to said arm for a limited extent, a link having first and second ends, with a first end pivotally attached at said location relatively close to the long side edge of the belt, said second end of said link being pivotally attached to said paddle at a location adjacent one end of said paddle, with said link serving to control and limit the motion of said paddle during rotation with respect to said rotatable mounted arm, and actuating means for causing selected rotation of said arm about said fixed pivot, such that upon said actuating means being activated to cause said arm to undertake rotation about said fixed pivot, said paddle will move in an arc across the conveyor belt in a direction consistent with the direction of belt travel to briefly but continuously contact the selected article, and cause such article to be deflected off of the belt, said actuating means thereafter causing said arm to undertake a return stroke and to resume its inactive position.

2. For use with an elongate conveyor belt designed to transport articles from one location to another, the pusher device as recited in claim 1 in which said actuating means involves the utilization of power from a rotatable power applying member rotating at an essentially constant speed in a single direction, with part of a 360° rotation of said member bringing about the outward stroke of said paddle across the belt, with the completion of the 360° rotation of said member thereafter causing said arm to return to said inactive position.

3. For use with an elongate conveyor belt designed to transport articles from one location to another, the pusher device as recited in claim 2 in which said rotatable power applying member rotates for a greater angular extent while providing power for the outward stroke of said paddle than during the return stroke, thus bringing about a more rapid return stroke than was involved in the outward stroke of said paddle.

4. For use with an elongate conveyor belt designed to transport articles from one location to another, the pusher device as recited in claim 2 in which an electrically controlled clutch/brake combination is utilized for enabling rotative power for the powering of said arm to be derived from said rotatable power applying member, with the de-energizing of the brake component of the clutch/brake and the associated energizing of said clutch component of said clutch/brake causing selected rotational power from said rotatable power applying member to bring about an outward stroke of said paddle followed by the return stroke, whereas the de-energizing of said clutch component and the simultaneous energizing of said brake component of said clutch/brake brings about the stopping of said arm in said inactive position.

5. For use with an elongate conveyor belt designed to transport articles from one location to another, the pusher device as recited in claim 4 in which the energizing of said clutch component is triggered by a barcode reader responding to the barcode utilized on a tag appended to an article traveling along the conveyor belt.

6. For use with an elongate conveyor belt designed to transport articles from one location to another, the pusher device as recited in claim 4 in which the energizing of said brake component of said clutch/brake combination causes said arm to reliably stop at said inactive position after an outward stroke.

7. For use with an elongate conveyor belt designed to transport articles from one location to another, the pusher device as recited in claim 6 in which the energizing of said brake component of said clutch/brake is brought about at the correct time by electrical components including at least one limit switch.

8. For use with an elongate conveyor belt designed to transport articles from one location to another, the pusher device as recited in claim 6 in which the energizing of said brake component of said clutch/brake combination is brought about at the correct time by electrical components including a rotary encoder.

9. For use with an elongate conveyor belt designed to transport articles from one location to another, the pusher device as recited in claim 1 in which means connected to said paddle are utilized for causing a limited amount of rotation of said paddle with respect to said arm before said paddle comes into contact with the selected article on the belt.

10. For use with an elongate conveyor belt designed to transport articles from one location to another, the pusher device as recited in claim 1 in which said paddle has front and rear ends, and restraint means are pivotally attached to said front end, such that during an outward stroke, said front end of said paddle will travel less far across the belt than the rear end of said paddle.

11. For use with an elongate conveyor belt designed to transport articles from one location to another, a pusher device as recited in claim 1 in which said paddle has front and rear ends, with said second end of said arm being rotatably attached at a location approximately midway between said front and rear ends of said paddle, and a pivotally mounted link attached to said front end of said paddle, so as to limit the outward movement of said front end of said paddle during rotation of said arm about its fixed pivot, the restraint of said front end of said paddle causing said paddle to pivot with respect to said second end of said arm and to permit the rear end of said paddle to move for a considerable extent across the belt as said arm nears its full stroke, thus imparting additional thrust to a contacted article carried by the belt.

12. A pusher device for use with an elongate conveyor belt operably arranged on a generally horizontally disposed support surface, which conveyor belt is designed to move along said surface and to transport articles from one location to another, mounting means operably located on said support surface relatively close to one long side edge of the belt, upon which mounting means said pusher device is operably mounted, said pusher device utilizing an elongate, rotatably mounted arm having first and second ends, said first end being pivotally affixed to said mounting means relatively close to the long side edge of the belt, with said rotatably mounted arm being arranged to rotate about said mounting means for less than 90°, said rotatably mounted arm normally residing in an inactive position in general alignment with the long side edge of the belt, said second end being arranged to extend, on occasion, from said inactive position, across at least a portion of the belt when a selected article carried by the belt is to be deflected off of the belt, an article-engaging paddle rotatably mounted on said second end of said rotatably mounted arm, said paddle having front and rear ends, with the attachment point of said paddle to said arm being at a location approximately midway between said front and rear ends, said paddle being able to rotate with respect to said arm for a limited extent, a link having first and second ends, with a first end pivotally attached to said support surface at a location laterally removed from said mounting means on said support surface, said second end of said link pivotally attached to said paddle at a location adjacent one end of said paddle, with said link serving to control and limit the motion of said paddle during rotation with respect to said rotatably mounted arm, actuating means for causing selected rotation of said rotatably mounted arm about said mounting means, such that upon said actuating means being activated to cause said rotatably mounted arm to undertake rotation in an arcuate manner about said mounting means, said paddle will move in an arc across the conveyor belt in a direction consistent with the direction of belt travel so as to briefly but continuously contact the selected article, and cause such article to be deflected off of the belt, said actuating means thereafter causing the retraction of said rotatably mounted arm from its extended position, and braking means for causing said arm to stop at said inactive position.

13. The pusher device for use with an elongate conveyor belt operably arranged on a generally horizontally disposed support surface as recited in claim 12 in which said braking means is caused to function by electrical components including at least one limit switch.

14. The pusher device for use with an elongate conveyor belt operably arranged on a generally horizontally disposed support surface as recited in claim 12 in which said braking means is caused to function by electrical components including a rotary encoder.

15. The pusher device for use with an elongate conveyor belt operably arranged on a generally horizontally disposed support surface as recited in claim 12 in which said actuating means involves the utilization of a rotatable power applying member rotating at an essentially constant speed in a single direction during the outward and return strokes of said paddle across the belt, with the subsequent completion of a 360° rotation causing said arm to thereafter return smoothly to said inactive position.

16. The pusher device for use with an elongate conveyor belt operably arranged on a generally horizontally disposed support surface as recited in claim 15 in which said rotatable power applying member rotates for a greater angular extent during the outward stroke of said paddle than during the return stroke, thus bringing about a more rapid return stroke than was involved in the outward stroke of said paddle.

17. The pusher device for use with an elongate conveyor belt operably arranged on a generally horizontally disposed support surface as recited in claim 15 in which an electrically controlled clutch/brake combination is utilized for enabling rotative power for the powering of said arm to be derived from said rotatable power applying member, with the energizing of said clutch component of said clutch/brake being in an alternate relationship to the energizing of said brake component of said clutch/brake, the energizing of said clutch component of said clutch/brake causing selected rotational power from said rotatable power applying member to bring about outward and return strokes of said paddle, whereas the de-energizing of said clutch component and the energizing of said brake component of said clutch/brake brings about the stopping of said arm in said inactive position.

18. The pusher device for use with an elongate conveyor belt operably arranged on a generally horizontally disposed support surface as recited in claim 17 in which the energizing of said clutch component is triggered by a barcode reader responding to the barcode utilized on a tag appended to an article traveling along the conveyor belt.

19. The pusher device for use with an elongate conveyor belt operably arranged on a generally horizontally disposed support surface as recited in claim 17 in which the energizing of said brake component of said clutch/brake combination causes said arm to reliably stop at said inactive position after the completion of outward and return strokes.

20. The pusher device for use with an elongate conveyor belt operably arranged on a generally horizontally disposed support surface as recited in claim 19 in which the energizing of said brake component of said clutch/brake combination is brought about by electrical components including at least one limit switch.

21. The pusher device for use with an elongate conveyor belt operably arranged on a generally horizontally disposed support surface as recited in claim 19 in which the energizing of said brake component of said clutch/brake combination is brought about by electrical components including a rotary encoder.

22. The pusher device for use with an elongate conveyor belt operably arranged on a generally horizontally disposed support surface as recited in claim 17 in which means connected to said paddle are utilized for causing a limited amount of rotation of said paddle with respect to said arm, which may occur before said paddle comes into contact with the selected article.

23. The pusher device for use with an elongate conveyor belt operably arranged on a generally horizontally disposed support surface as recited in claim 17 in which said paddle has front and rear ends, and restraint means are attached to said front end, such that during an outward stroke, said front end of said paddle will travel less far across the belt than the rear end of said paddle.

24. The pusher device for use with an elongate conveyor belt operably arranged on a generally horizontally disposed support surface as recited in claim 17 in which said paddle has front and rear ends, with said second end of said arm being rotatably attached at a location approximately midway between said front and rear ends of said paddle, and a pivotally mounted link attached adjacent said front end of said paddle, so as to limit the outward movement of said front end of said paddle during rotation of said arm about its fixed pivot, the restraint of said front end of said paddle causing said paddle to pivot with respect to said second end of said arm and to permit the rear end of said paddle to move for a considerable extent across the belt, and to give additional thrust to a contacted article carried by the belt.

25. A pusher device for use with an elongate conveyor belt operative on a support surface, which conveyor belt is designed to move along the surface and to transport articles from one location to another, said pusher device comprising a pivotally-mounted article-engaging paddle for contacting a selected article being conveyed on the belt, and while maintaining continuous contact with such article, being arranged to cause the removal of such article from the belt, mounting means operably located on the support surface relatively close to one long side edge of the conveyor belt, upon which mounting means an elongate, rotatable arm having first and second ends is mounted, said first end being pivotally affixed to said mounting means, actuating means for selectively causing said arm to rotate about said mounting means for less than 90° during article removal from the belt, said paddle being pivotally attached to said second end of said arm so as to be able to rotate for a limited extent with respect to said arm, said second end of said arm being arranged to extend, on occasion, from an inactive position in which it resides alongside the belt, across at least a portion of the belt when a selected article carried by the belt is to be deflected off of the belt by said paddle, means for assuring controlled rotative motion of said paddle with respect to said arm during rotation of said arm about said mounting means, whereby upon said actuating means being activated to cause said arm to undertake rotation in an arcuate manner about said mounting means, said paddle will travel outwardly in an arc across the conveyor belt and cause such article to be deflected off of the belt, said actuating means thereafter causing the retraction of said arm from its extended position into the inactive position alongside the belt.

26. The pusher device as recited in claim 25 in which said actuating means involves the utilization of power from a rotatable power applying member rotating at an essentially constant speed in a single direction, with part of a 360° rotation of said member bringing about the outward stroke of said paddle across the belt, with the completion of the 360° rotation of said member thereafter causing said arm to return to the inactive position.

27. The pusher device as recited in claim 26 in which said rotatable power applying member rotates for a greater angular extent while providing power for the outward stroke of said paddle than during the return stroke, thus bringing about a more rapid return stroke than was involved in the outward stroke of said paddle.

28. A pusher device for use with an elongate conveyor belt operably arranged on a generally horizontally disposed support surface, which conveyor belt is designed to move along the surface and to transport articles from one location to another, said pusher device comprising a pivotally-mounted article-engaging paddle for contacting a selected article being conveyed on the belt, and while maintaining continuous contact with such article, being arranged to cause the removal of such article from the belt, mounting means operably located on the support surface relatively close to one long side edge of the conveyor belt, upon which mounting means said pusher device is operably mounted, said pusher device also comprising an elongate, rotatably mounted arm having first and second ends, said first end being pivotally affixed to said mounting means relatively close to the long side edge of the belt, actuating means for selectively causing said rotatably mounted arm to rotate about said mounting means for less than 90° during article removal from the belt, said rotatably mounted arm normally residing in an inactive position in general alignment with the long side edge of the belt, said paddle being pivotally attached to said second end of said arm so as to be able to rotate for a limited extent with respect to said arm, said second end of said arm being arranged to extend, on occasion, from the inactive position, across at least a portion of the belt when a selected article carried by the belt is to be deflected off of the belt by said paddle, said paddle having front and rear ends, with the pivotal attachment point of said paddle to said second end of said arm being at a location approximately midway between said front and rear ends, pivotally mounted motion controlling means extending between the support surface and said paddle, for assuring controlled motion of said paddle during rotation of said arm about said mounting means, such that upon said actuating means being activated to cause said arm to undertake rotation in an arcuate manner about said mounting means, said paddle will travel outwardly in an arc across the conveyor belt in a direction consistent with the direction of belt travel so as to briefly but continuously contact the selected article, and cause such article to be deflected off of the belt, said actuating means thereafter causing the retraction of said arm from its extended position, and braking means for causing said arm to stop at the inactive position.

29. The pusher device as recited in claim 28 in which said actuating means involves the utilization of power from a rotatable power applying member rotating at an essentially constant speed in a single direction, with part of a 360° rotation of said member bringing about the outward stroke of said paddle across the belt, with the completion of the 360° rotation of said member thereafter causing said arm to return to the inactive position.

30. The pusher device as recited in claim 29 in which said rotatable power applying member rotates for a greater angular extent while providing power for the outward stroke of said paddle than during the return stroke, thus bringing about a more rapid return stroke than was involved in the outward stroke of said paddle.

* * * * *